United States Patent [19]
Kawai et al.

[11] Patent Number: 5,771,702
[45] Date of Patent: Jun. 30, 1998

[54] AIR CONDITIONER FOR VEHICLE

[75] Inventors: Takayoshi Kawai, Hoi-gun; Yuji Ito, Ichinomiya, both of Japan

[73] Assignee: Denso Corporation, Kariya, Japan

[21] Appl. No.: 781,644

[22] Filed: Jan. 10, 1997

[30] Foreign Application Priority Data

Jan. 11, 1996 [JP] Japan .................................. 8-003397

[51] Int. Cl.$^6$ .................................................. B60H 1/00
[52] U.S. Cl. ............................... 62/203; 62/244; 62/180; 62/186
[58] Field of Search ............................. 62/177, 178, 180, 62/203, 239, 244, 186

[56] References Cited

U.S. PATENT DOCUMENTS

| | | | |
|---|---|---|---|
| 4,473,109 | 9/1984 | Kojima et al. | 62/244 |
| 4,763,564 | 8/1988 | Czarnecki et al. | 62/244 |
| 5,142,881 | 9/1992 | Nagayama | 62/228.5 |

FOREIGN PATENT DOCUMENTS

| | | |
|---|---|---|
| A-3-25018 | 2/1991 | Japan . |
| A-4-46819 | 2/1992 | Japan . |
| A-4-78710 | 3/1992 | Japan . |
| A-4-274921 | 9/1992 | Japan . |
| A-4-314612 | 11/1992 | Japan . |
| A-58-194618 | 11/1993 | Japan . |
| A-6-115345 | 4/1994 | Japan . |
| A-6-255343 | 9/1994 | Japan . |

*Primary Examiner*—William Doerrler
*Attorney, Agent, or Firm*—Harness, Dickey & Pierce PLC

[57] ABSTRACT

According to the present invention, an air conditioner for a vehicle cancels the thermal interference with a rear-seat side from a front-seat side even when the difference in target temperature between the front-seat side and the rear-seat side is equal to a predetermined value or more. When the difference a set temperature on the front-seat side and a set temperature on the rear-seat side is equal to ±3 (°C.) or more, a ratio of the outside air sucked into a front-seat air conditioner unit is decreased according to an increase in the difference between the set temperatures. In this way, since the amount of air which is blown out from the front-seat air conditioner unit and further flows into the rear-seat side is decreased, it is possible to cancel the thermal interference from the front-seat side, by means of air blown out from a rear-seat air conditioner unit.

19 Claims, 9 Drawing Sheets

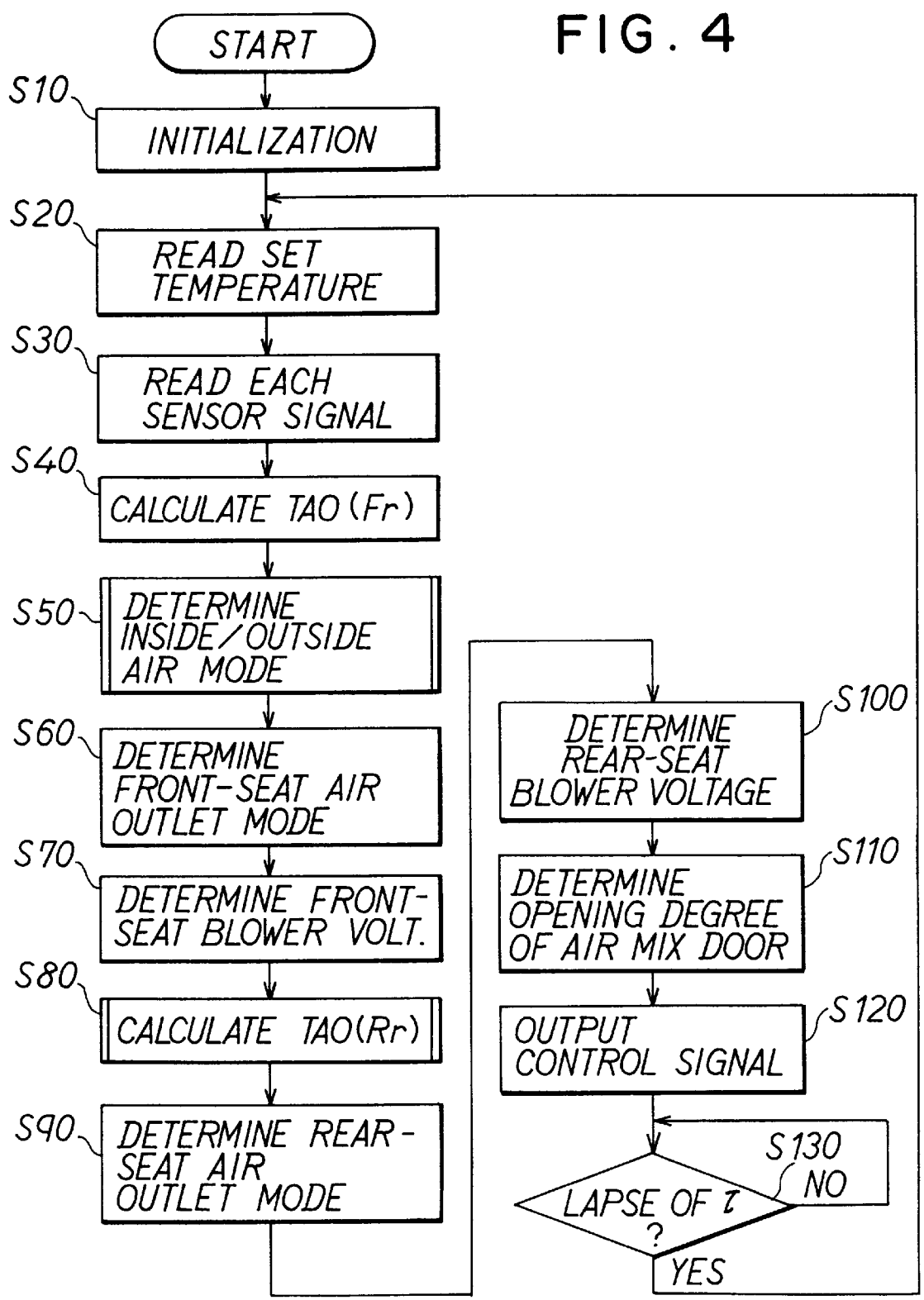

AIR CONDITIONER FOR VEHICLE

CROSS REFERENCE TO THE RELATED APPLICATION

This is application is based on and claims priority of Japanese Patent Application No. Hei. 8-3397 filed on Jan. 11, 1996.

BACKGROUND OF THE INVENTION

1. Field of the Invention

The present invention relates to an air conditioner for a vehicle, capable of independently controlling the temperatures of front-seat side and rear-seat side spaces in the passenger compartment of the vehicle.

2. Description of Related Art

In a conventional air conditioner for a vehicle as disclosed in, for example, JP-A-4-78710, the target air temperature of the air blown out from the front-seat air conditioner unit is calculated by using the environmental factor relative to the rear-seat side thermal load as an additional calculation factor, and air conditioning of the front-seat side space is performed based on the calculated target air temperature. Also, the target air temperature of the air blown out from the rear-seat air conditioner unit is calculated by using the environmental factor relative to the front-seat side thermal load as an additional calculation factor, and air conditioning of the rear-seat side space is performed based on the calculated target air temperature.

As described above, in the conventional air conditioner, by calculating the target air temperature of one of the front and rear-seat sides by using the above-described environmental factor relative to the other as an additional calculation factor, the thermal interference in the one seat side space from the other seat side space can be cancelled.

In a normal type vehicle, because a discharge port for discharging the outside air having been introduced into the passenger compartment to the outside of the passenger compartment is provided on the rear-seat side, when the inside/outside air mode of the front-seat air conditioner unit is an outside air introduction mode, the air blown out from the front-seat air conditioner unit flows also into the rear-seat side space. On the other hand, in a normal type vehicle, because an inside air suction port for sucking the inside air is provided on the front-seat side, when the inside/outside air mode of the front-seat air conditioner unit is an inside air circulation mode, the air blown out from the front-seat air conditioner unit little flows into the rear-seat side space and circulates almost within only the front-seat side space.

In the case of the above conventional air conditioner, when the inside/outside air mode of the front-seat air conditioner unit is the outside air introduction mode, the air blown out from the front-seat air conditioner unit flows into the rear-seat side space. On the other hand, when the inside/outside air mode is the inside air circulation mode, the air blown out from the front-seat side air conditioner unit circulates almost within only the front-seat side space.

Thus, when the inside/outside air mode of the front-seat air conditioner unit is the outside air introduction mode, in a case where the target temperature (the set temperature or target air temperature) for the rear-seat side differs from the target temperature for the front-seat side, the rear-seat side space may be affected by the thermal interference from the front-seat side as compared with when the inside/outside air mode thereof is the inside air circulation mode.

In the above conventional air conditioner, the inside/outside air mode of the front-seat air conditioner unit is controlled so as to conform to a predetermined pattern, according to the target air temperature for the front-seat side. Accordingly, as described above, even when the target temperature for the rear-seat side differs from that for the front-seat side, the inside/outside air mode of the front-seat air conditioner unit may become the outside air introduction mode according to the target air temperature for the front-seat side.

At this time, in the conventional air conditioner, the air temperature is corrected toward the high temperature side (or low temperature side) so that the rear-seat air conditioner unit may cancel the thermal interference from the front-seat side. However, when the difference between the target temperatures for the front-seat side and the rear-seat side becomes too large, the temperature adjusting capacity of the temperature adjusting means of the rear-seat air conditioner unit reaches the maximum limit. In this case, when the difference between the target temperatures has become again larger, it becomes impossible to cancel the thermal interference from the front-seat side merely by means of the air blown out from the rear-seat air conditioner unit; as a result, the rear-seat side temperature may become inconveniently deviated toward the target temperature for the front-seat side from the target temperature for the rear-seat side.

SUMMARY OF THE INVENTION

In view of the above, an object of the present invention is to solve the above-mentioned problems.

In order to attain the above object, according to the present invention, when a difference between a target temperature for a front-seat side space and a target temperature for a rear-seat side space is equal to a predetermined value (temperature) or more, a ratio of the outside air sucked into a front-seat air conditioner is reduced so as to be equal to a predetermined value (ratio) or less.

When the difference between the target temperatures is equal to the predetermined value or more, it is highly likely that a temperature adjusting capacity of temperature adjusting means of a rear-seat air conditioner unit may become the maximum limit. At this time, the ratio of the outside air sucked into the front-seat air conditioner unit is set to the predetermined value or less, the amount of the air which is blown out from the front-seat air conditioner unit and further flows into the rear-seat side becomes lower than the predetermined value. Therefore, the thermal interference from the front-seat side can be canceled by means of the conditioned air by the temperature adjusting means of the rear-seat air conditioner unit, and it is possible to maintain the rear-seat side at the target temperature.

The above-mentioned predetermined temperature is the one which can cancel the thermal interference from the front-seat side sufficiently canceled by means of the air blown out from the rear-seat air conditioner unit when the difference between the target temperatures is equal to the prescribed value or less in even a case where the front-seat air conditioner unit is in the complete outside air introduction mode. Also, the above-mentioned predetermined ratio is the one in which the rear-seat air conditioner unit can cancel the thermal interference from the front-seat side, and the temperature of the rear-seat side space can be maintained at the target temperature.

Also, the inside/outside air switching means is controlled so that when the difference between the target temperatures is equal to a prescribed value or more, the ratio of the outside air sucked into the front-seat air conditioner unit may be lowered according to an increase in the difference between the target temperatures.

In this way, even when the difference between the target temperatures becomes large, and the degree of the thermal interference from the front-seat side increases, the ratio of the outside air sucked into the front-seat air conditioner unit becomes lower correspondingly. Therefore, it is possible to cancel the influence of the thermal interference from the front-seat side within the temperature adjusting capacity of the temperature adjusting means of the rear-seat air conditioning unit, and the rear-seat side can be maintained at the target temperature.

The inside/outside air switching means is further controlled so that when the difference between the target temperatures is equal to the predetermined value or more and the temperature adjusting capacity of the temperature adjusting means of the rear-seat air conditioning unit is in the maximum limit, the ratio of the outside air sucked into the front-seat air conditioner unit is set to the predetermined value or less.

In this way, in a case where the temperature adjusting capacity of the temperature adjusting means of the rear-seat air conditioning unit becomes the maximum limit, when the difference between the target temperatures is equal to the predetermined value or more, the thermal interference from the front-seat side cannot be canceled by means of only the air blown out from the rear-seat air conditioner unit, however, since the ratio of the outside air sucked into the front-seat air conditioner unit is set to the prescribed value or less, the effect of the thermal interference from the front-seat side can be canceled, and the rear-seat side can be maintained at the target temperature.

BRIEF DESCRIPTION OF THE DRAWINGS

Additional objects and advantages of the present invention will be more readily apparent from the following detailed description of preferred embodiments thereof when taken together with the accompanying drawings in which:

FIG. 4 is a flow chart illustrating a control process executed by a microcomputer according to the first embodiment;

DETAILED DESCRIPTION OF THE PREFERRED EMBODIMENTS

A first embodiment to which the present invention is applied to an air conditioner for a one-box car will be described with reference to FIGS. 1 to 13.

Figure 1:
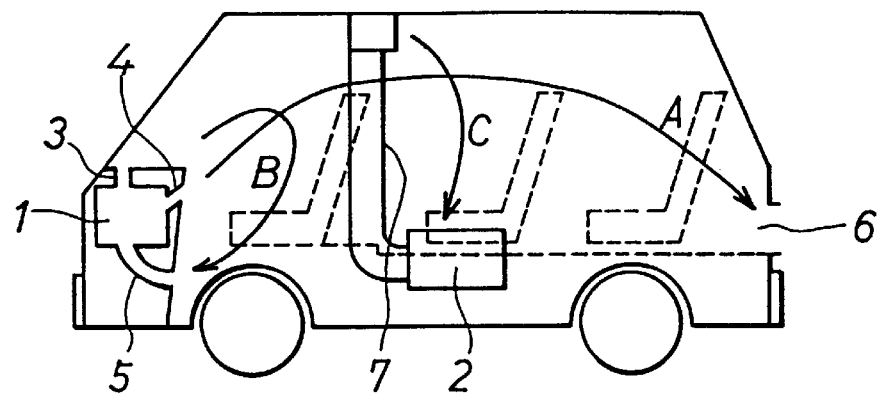
FIG. 1 is a schematic diagram illustrating air conditioner units mounted on the vehicle according to a first embodiment of the present invention.

As illustrated in FIG. 1, on a front-seat side in the passenger compartment, there is provided a front-seat air conditioner unit 1 for air conditioning the front-seat side space. On a rear-seat side in the passenger compartment, there is provided a rear-seat air conditioner unit 2 for air conditioning the rear-seat side space.

The front-seat air conditioner unit 1 is provided in a dashboard provided on the front-seat side and blows out the air toward the inner surface of a windshield, an upper half body of a front-seat passenger, and feet of a front-seat passenger, respectively, through a defroster duct 3, a front-seat duct 4 and a front-seat foot duct 5.

When the inside/outside air mode of the front-seat air conditioner unit 1 is an outside air introduction mode, the air blown out from the front-seat air conditioner unit 1 passes, as indicated by an arrow A in FIG. 1, through the front-seat side space and the rear-seat side space and is discharged to the outside of the passenger compartment from a discharge port 6 opened in a rear package tray (not illustrated) located at a rear-most position in the passenger compartment.

Also, when the inside/outside air mode of the front-seat air conditioner unit 1 is an inside air circulation mode, the air blown out from the front-seat air conditioner unit 1 circulates, as indicated by an arrow B in FIG. 1, substantially through only the front-seat side space and is sucked into the front-seat air conditioner unit 1 from a front-seat inside air suction port (not illustrated).

The rear-seat air conditioner unit 2 is provided in a space formed between the inner wall of the passenger compartment on the rear-seat side and the outer plate of the vehicle. The rear-seat air conditioner unit 2 blows out mainly the cool air from the vehicle inside ceiling toward the head of the rear-seat passenger through a ceiling duct 7 and also blows out mainly the warm air toward the feet of the rear-seat passenger through a rear-seat foot duct (not illustrated).

The rear-seat air conditioner unit 2 sucks only the inside air and blows out the inside air into the interior of the passenger compartment. For example, the air blown out from the ceiling duct 7 circulates, as indicated by an arrow C in FIG. 1, through only the rear-seat side space and is sucked again into the rear-seat air conditioner unit 2 from a rear-seat inside air suction port (not illustrated).

An ECU 8 (Electronic Control Unit, see FIG. 3) controls air conditioning means in each of the units 1 and 2 independently.

Figure 2A:
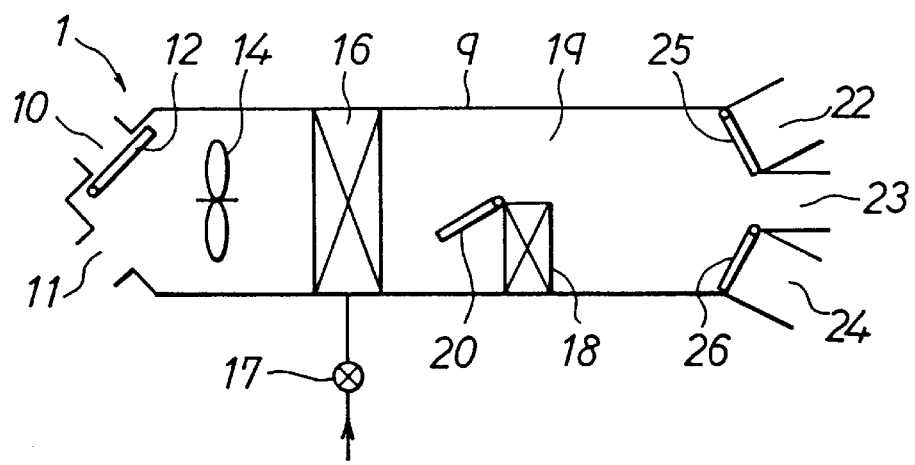
FIG. 2A is a schematic diagram illustrating a front-seat air conditioner unit according to the first embodiment.

Next, a construction of the front-seat air conditioner unit 1 will be described with reference to FIG. 2A.

At an air upstream side portion of a front-seat air conditioning casing 9, there are formed an inside air suction port 10 for sucking the inside air in the passenger compartment and an outside air suction port 11 for sucking the outside air. Also, there is provided an inside/outside air switching door 12 for switching the suction ratio between the inside air and outside air which are respectively sucked from the suction ports 10 and 11. This inside/outside air switching door 12 is driven by a servo motor 13 (see FIG. 3).

At a downswitch side portion of the inside/outside air switching door 12, there is disposed a fan 14. This fan 14 is driven by a blower motor 15 (see FIG. 3), and the rotational speed of the fan, i.e., the amount of the air blown out into the passenger compartment, is controlled by the blower voltage applied to the blower motor 15. This blower voltage is determined by the ECU 8 (see FIG. 3).

On the downstream side of the fan 14, there is disposed a front-seat evaporator 16 as a cooling heat exchanger. The front-seat evaporator 16 constitutes a well known refrigeration cycle with a condenser, pressure-reduction means, etc. as well as a compressor (not illustrated) driven by the engine of the automotive vehicle, which are connected to each other by a refrigerant piping. In the refrigerant piping portion located on the refrigerant upstream side of the front-seat evaporator 16, there is provided an electromagnetic valve 17 for controlling the flow of the refrigerant into the front-seat evaporator 16.

At an air downstream side portion of the front-seat evaporator 16, there is disposed a front-seat heater core 18 as a heating heat exchanger. In the front-seat heater core 18, the engine cooling water flows. By using the cooling water as the heat source, the front-seat heater core 18 reheats the air passing therethrough. In the front-seat air conditioning casing 9, there is formed a bypass passage 19 through which the cool air from the front-seat evaporator 16 bypasses the front-seat heater core 18.

Within the front-seat air conditioning casing 9, there is disposed a front-seat air mix door 20 for adjusting the ratio between an amount of the cool air passing through the front-seat heater core 18 and an amount of the cool air passing through the bypass passage 19. The front-seat air mix door 20 is driven by a servo motor 21 (see FIG. 3).

At the air downstream side portions of the front-seat air conditioning casing 9, there are formed a defroster opening portion 22 to which the defroster duct 3 (FIG. 1) is connected, a front-seat face opening portion 23 to which the front-seat face duct 4 (FIG. 1) is connected and a front-seat foot opening portion 24 to which the front-seat foot duct 5 (FIG. 1) is connected.

Within the front-seat air conditioning casing 9, there are provided a defroster door 25 for opening or closing the defroster opening portion 22 and a face/foot switching door 26 for opening or closing the front-seat face opening portion 23 and the front-seat foot opening portion 24 selectively. These doors 25 and 26 are driven by servo motors 27 and 28 (see FIG. 3), respectively.

Figure 2B:
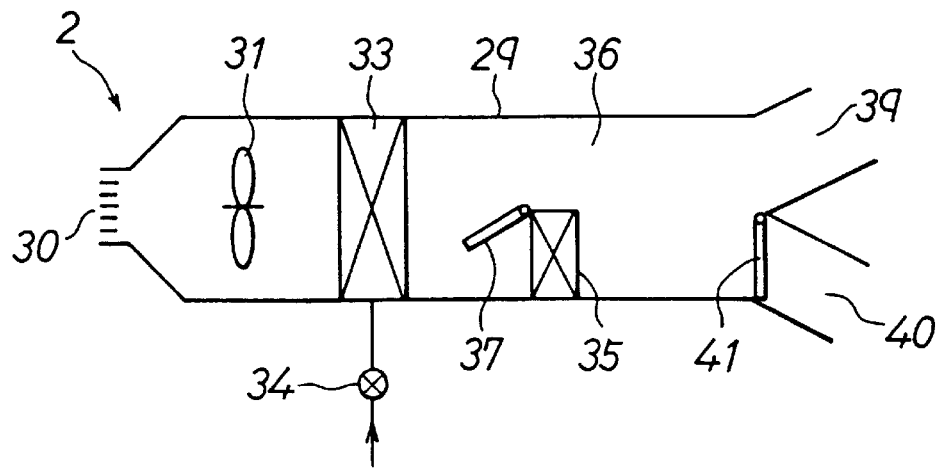
FIG. 2B is a schematic diagram illustrating a rear-seat air conditioner unit according to the first embodiment.

Next, a construction of the rear-seat air conditioning casing 2 will be described with reference to FIG. 2B.

At an air upstream side portion of the rear-seat air conditioning casing 29, there is formed an inside air suction port 30 opened toward feet of the rear-seat passenger.

A fan 31 is disposed within the rear-seat air conditioning casing 29. This fan 31 is driven by a blower motor 32 (see FIG. 3), and the rotational speed of the fan 31 is controlled by the blower voltage applied to the blower motor 32. The blower voltage is determined by the ECU 8 (see FIG. 3).

On the downstream side of the fan 31, there is disposed a rear-seat evaporator 33 as a cooling heat exchanger. The rear-seat evaporator 33 constitutes the same refrigeration cycle with the above-mentioned front-seat evaporator 16. In the refrigerant piping portion, on the refrigerant upstream side of the rear-seat evaporator 33, there is provided an electromagnetic valve 34 for controlling the flow of the refrigerant into the rear-seat evaporator 33.

At an air downstream side position of the rear-seat evaporator 33, there is disposed a rear-seat heater core 35 as a heating heat exchanger. In the rear-seat heater core 35, the engine cooling water flows. By using the cooling water as the heat source, the rear-seat heater core 35 reheats the air passing therethrough. In the rear-seat air conditioning casing 29, there is formed a bypass passage 36 through which the cool air from the rear-seat evaporator 33 bypasses the rear-seat heater core 35.

Within the rear-seat air conditioning casing 29, there is disposed a rear-seat air mix door 37 for adjusting a ratio between an amount of the cool air passing through the rear-seat heater core 35 and an amount of the cool air passing through the bypass passage 36. The rear-seat air mix door 37 is driven by a servo motor 38 (see FIG. 3).

At the air downstream side positions, there are formed a rear-seat face opening portion 39 to which the ceiling duct 7 (FIG. 1) is connected and a rear-seat foot opening portion 40 to which the rear-seat foot duct (not illustrated) is connected.

Within the rear-seat air conditioning casing 29, there is provided a face/foot switching door 41 for opening or closing the rear-seat face opening portion 39 and the rear-seat foot opening portion 40. This door 41 is driven by a servo motor 42 (see FIG. 3).

Figure 3:
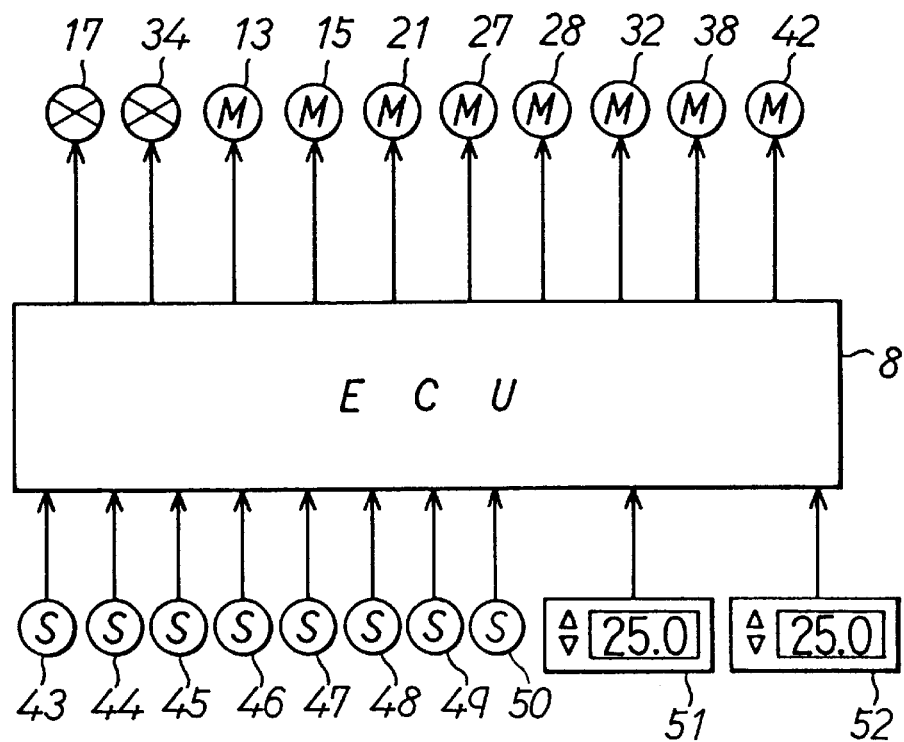
FIG. 3 is a block diagram illustrating a control system according to the first embodiment.

Next, a construction of a control system according to this embodiment will be described with reference to FIG. 3.

The ECU 8 for controlling each of the air conditioning means in the air conditioner units 1 and 2 is equipped with, for example, a well known microcomputer composed of a CPU, a ROM, a RAM, etc. When an ignition switch of the vehicle has been turned on, an electric power is supplied to the ECU 8 from a battery (not illustrated).

To input terminals of the ECU 8 there are electrically connected a front-seat inside air temperature sensor 43 for detecting the temperature on the front-seat side in the passenger compartment, a rear-seat inside air temperature sensor 44 for detecting the temperature on the rear-seat side in the passenger compartment, an outside air temperature sensor 45 for detecting the outside air temperature, an sunlight amount sensor 46 for detecting an amount of the sunlight entering the passenger compartment, a front-seat evaporator temperature sensor 47 for detecting the temperature of the air immediately after having passed through the front-seat evaporator 16, a rear-seat evaporator temperature sensor 48 for detecting the temperature of the air immediately after having passed through the rear-seat evaporator 33, a water temperature sensor 49 for detecting the temperature of the engine cooling water, an opening degree sensor 50 mounted on the servo motor 13, for detecting an opening degree of the inside/outside air switching door 12, a front-seat temperature setting device 51 for setting a front-seat side target temperature, and a rear-seat temperature setting device 52 for setting a rear-seat side target temperature.

Among these signals, the signals from the sensors 43 to 50 are A/D converted in an A/D converter circuit (not illustrated) within the ECU 8, and are input to the microcomputer.

Also, to output terminals of the ECU 8, there are electrically connected the electromagnetic valves 17 and 34 and the servo motors 21, 27, 28, 38 and 42 and the blower motors 15 and 32.

The front-seat temperature setting device 51 is provided on a front-seat air conditioning panel provided on the dashboard on the front-seat side. On the front-seat air conditioning panel, there are further disposed a switch for switching the air outlet mode, a switch for switching the inside/outside air mode, a switch for adjusting the amount of blowing air, an auto-switch for automatically controlling each of the air conditioning means of the front-seat air conditioner unit 1, etc. (none of these switches is illustrated).

Also, the rear-seat temperature setting device 52 is disposed on a rear-seat air conditioning panel provided on the inner wall on the rear-seat side in the passenger compartment. On the rear-seat air conditioning panel, there are further disposed a switch for adjusting the amount of blowing air, an auto-switch for automatically controlling each of the air conditioning means of the rear-seat air conditioner unit 2, etc. (none of these switches is illustrated).

Next, a control process executed by the microcomputer will be described with reference to FIG. 4.

When the ignition switch is turned on and the electric power is supplied to the ECU 8, a routine of FIG. 4 is started, and an initialization process in step S10 is executed. In the next step S20, set temperatures (Tset(Fr) and Tset(Rr)) which have been set by the respective temperature setting devices 51 and 52 are read in.

In the next step S30, the signals which have been obtained by A/D conversion of the signal values from the respective sensors 43 to 50, (Tr(Fr), Tr(Rr), Tam, Ts, Te(Fr), Te(Rr), Tw, TP) are read in.

In the next step S40, a front-seat side target air temperature TAO(Fr) (unit:°C.) on the front-seat side is calculated based on the following equation (1) pre-stored in the ROM.

$$TAO(Fr) = Kset(Fr) \times Tset(Fr) - Kr(Fr) \times Tr(Fr) - Kam(Fr) \times Tam - Ks(Fr) \times Ts + C(Fr) \qquad (1)$$

wherein the Kset(Fr), Kr(Fr), Kam(Fr) and Ks(Fr) represent correction gains and the C(Fr) represents a correction constant.

Figure 5:
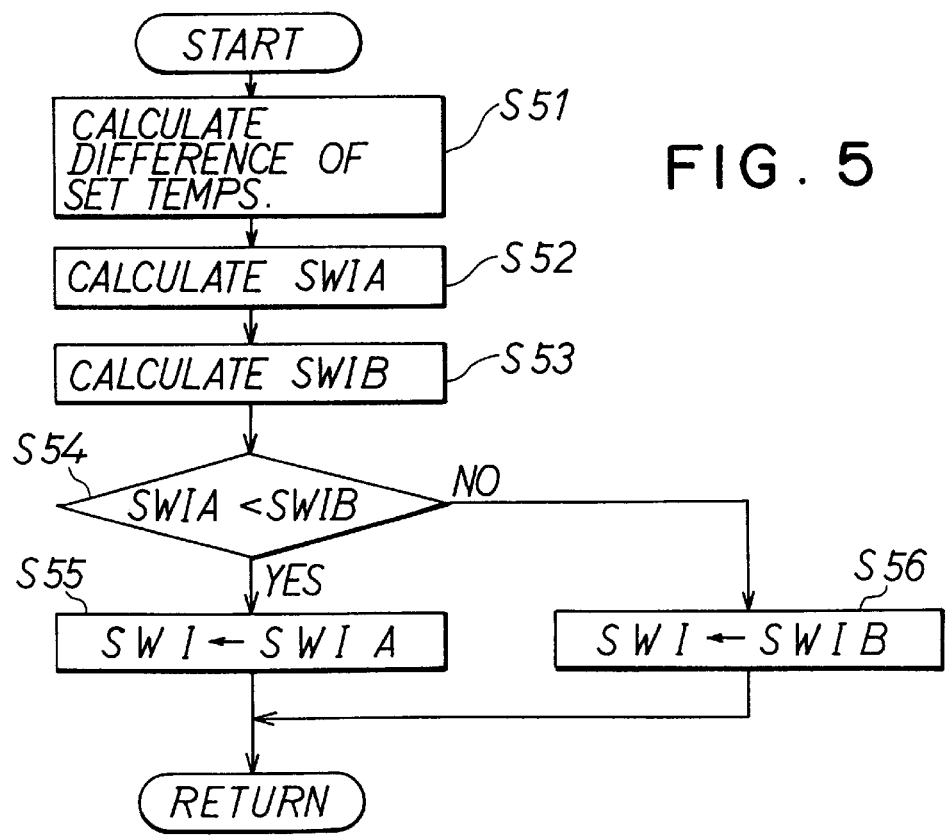
FIG. 5 is a flow chart illustrating the detail of a step S50 in FIG. 4.

When it proceeds to the next step S50, a subroutine of FIG. 5 is called with the result that the inside/outside air mode of the front-seat air conditioner unit 1 is determined. The process in this subroutine of FIG. 5 will now be described.

In step S51, the difference between the front-seat and rear-seat set temperatures (Tset(Fr)–Tset(Rr)) is calculated as the target difference in temperature between the front-seat and rear-seat spaces.

Figure 6:
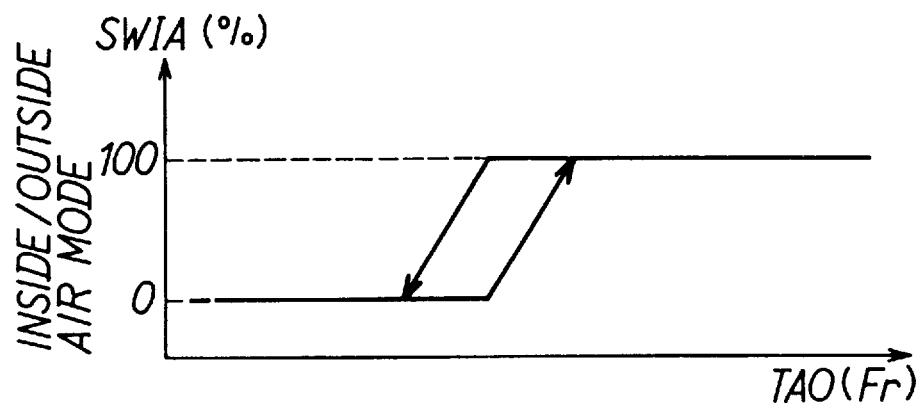
FIG. 6 is a map showing a relationship between a first temporary target opening degree SWIA for an inside/outside air switching door and a target air temperature according to the first embodiment.

In the next step S52, based on the target air temperature TAO(Fr) and a map of FIG. 6, which is pre-stored in the ROM, a first temporary target opening degree SWIA for the inside/outside air switching door 12 is calculated. Here, the SWIA=100 (%) means a complete outside air introduction mode and the SWIA=0 (%) means a complete inside air circulation mode.

The map of FIG. 6 is a known one which has been prepared so as to obtain an inside/outside air mode which is suitable for an air conditioning of the front-seat side.

Figure 7:
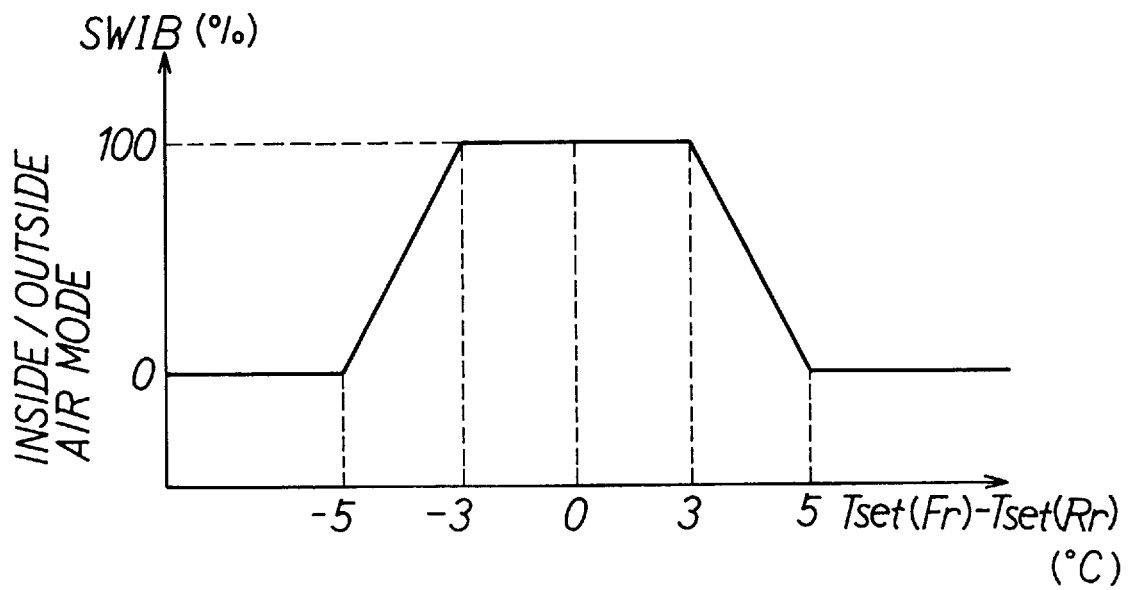
FIG. 7 is a map showing a relationship between a second temporary target opening degree SWIB for the inside/outside switching door and a difference of set temperature between a front-seat side and a second seat side according to the first embodiment.

In the next step S53, based on the difference in set temperature and a map of FIG. 7, which is pre-stored in the ROM, a second temporary target opening degree SWIB for the inside/outside air switching door 12 is calculated. Here, the SWIB=100 (%) means a complete outside air introduction mode and the SWIB=0 (%) means a complete inside air circulation mode.

As a result of the experiments performed by the inventors, it has been confirmed that, if the opening degree of the inside/outside air switching door 12 relative to the difference in set temperature is controlled as illustrated in FIG. 7, the thermal interference from the front-seat side can be canceled by the air blown out from the rear-seat air conditioner unit 2, and the rear-seat side space can be maintained to the temperature of Tset(Rr). The map of FIG. 7 is one which has been prepared based on these experimental results.

Specifically, as a result of the above-mentioned experiments, when the difference in set temperature is not larger than a first predetermined temperature (±3 (°C.) in this embodiment) the thermal interference from the front-seat side can be sufficiently canceled by the air blown out from the rear-seat air conditioner unit 2 even when the complete outside air introduction mode is set on the front-seat air conditioner unit 1 side, it is set such that SWIB=100 (%).

On the other hand, as a result of the above-mentioned experiments, when the difference in set temperature exceeded the first predetermined temperature the thermal interference from the front-seat side can not completely be canceled by only the air blown out from the rear-seat air conditioner 2 while the complete outside air introduction mode is set on the front-seat air conditioner unit 1 side, with the result that the rear-seat side temperature cannot be maintained at Tset (Rr). Therefore, in order to maintain the rear-seat side temperature at the Tset (Rr), it is set such that the amount of sucked inside air increases with an increase in the difference in set temperature.

In this way, the amount of the air, which is blown out from the front-seat air conditioner unit 1 and flows into the rear-seat side space, decreases. Therefore, it is possible to cancel the thermal interference from the front-seat side by the air blown out from the rear-seat air conditioner unit 2.

Also, if the environment is in an ordinary state, the difference in set temperature between the front-seat and rear-seat sides is not set at a value which is greater than the second predetermined temperature (which is larger than the first predetermined temperature, ±5° C. in this embodiment), when the difference in set temperature is larger than the second predetermined temperature, it is evenly set such that SWIB=0 (%).

In the next steps S54 to S56, a smaller one of the SWIA and the SWIB is set to a final target opening degree SWI. Specifically, in step S54, it is determined whether the SWIA is smaller than the SWIB. When the determination in this step is YES, the SWIA is determined in step S55 to be the final target opening degree SWI. When the determination in that step is NO, the SWIB is determined in step S56 to be the final target opening degree SWI. Then, the process exits from the subroutine.

Figure 8:
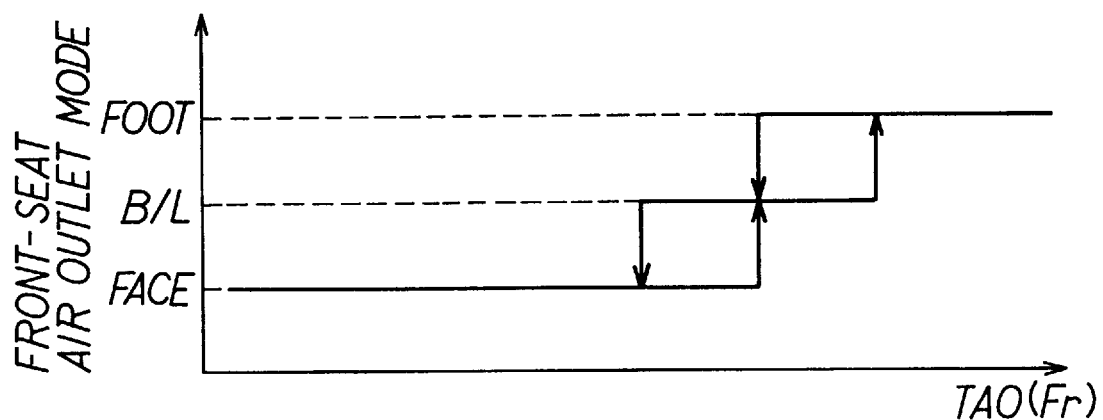
FIG. 8 is a map showing a relationship between a front-seat air outlet mode and a target air temperature according to the embodiment.

In step S60 of FIG. 4, the air outlet mode of the front-seat air conditioner unit 1 is determined based on the TAO(Fr) and a map of FIG. 8, which is pre-stored in the ROM.

In a face mode (FACE), conditioned air is blown out toward the upper half body of the front-seat passenger through the front-seat face duct 4 (FIG. 1). In a bi-level mode (B/L), the conditioned air is blown out toward the upper half body and feet of the front-seat passenger through the front-seat face duct 4 and front-seat foot duct 5 (FIG. 1). In a foot mode (FOOT), the conditioned air is blown out toward the feet of the front-seat passenger through the front-seat foot duct 5.

Figure 9:
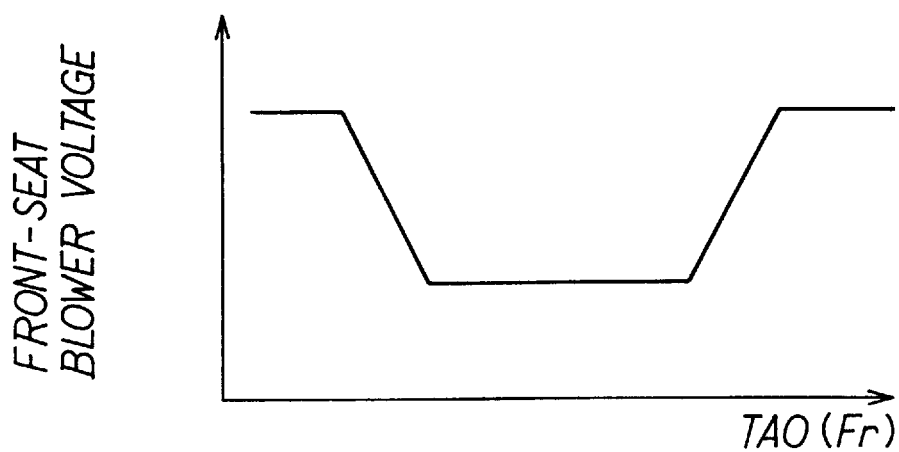
FIG. 9 is a map showing a relationship between a front-seat blower voltage and a target air temperature according to the first embodiment.

In the next step S70, the front-seat blower voltage applied to the blower motor 15 of the front-seat air conditioner unit 1 is determined based on the TAO(Fr) and a map of FIG. 9, which is pre-stored in the ROM.

Figure 10:
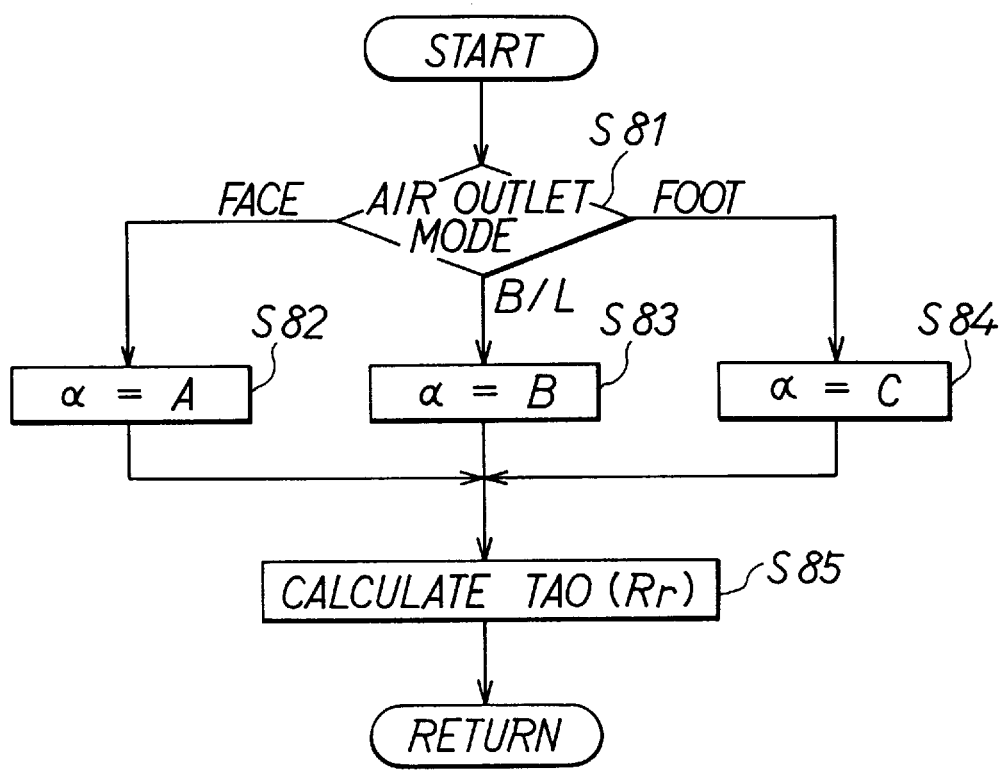
FIG. 10 is a flow chart illustrating the detail of a step S80 in FIG. 4.

When it proceeds to the next step S80, a subroutine of FIG. 10 is called, and a rear-seat side target air temperature TAO(Rr) is determined. The process in this subroutine of FIG. 10 will now be described.

In step S81, it is determined what type of the air outlet mode is the front-seat side air outlet mode. That is, when the determination is the face mode (FACE), it proceeds to step S82. When the determination is the bi-level mode (B/L), it proceeds to step S83. When the determination is the foot mode (FOOT), it proceeds to step S84.

In steps S82 to S84, the correction constant α (see the following equation (2)) for representing the degree of the influence of the air outlet mode of the front-seat air conditioner unit 1 on the rear-seat side is determined. Specifically, in step S82, α=A; in step S83, α=B; and, in step S84, α=C (0≦C<B<A≦1).

In the next step S85, a rear-seat side target air temperature TAO(Rr) (unit:°C.) is calculated based on the following equation (2) which is pre-stored in the ROM. Then, the process exits from this subroutine.

$$TAO(Rr) = Kset(Rr) \times Tset(Rr) - Kr(Rr) \times Tr(Rr) - \\ Kam(Rr) \times Tam - Ks(Rr) \times Ts + C(Rr) - \\ \alpha \times ((SWI + \beta)/(100 + \beta)) \times (Tset(Fr) - Tset(Rr)) \quad (2)$$

wherein the Kset(Rr), Kr(Rr), Kam(Rr) and Ks(Rr) represent the correction gains and the C(Rr) represents the correction constant. Also, the β represents the correction constant that represents the degree of the influence of the inside/outside air mode of the front-seat air conditioner unit 1 on the rear-seat side.

Here, the reason for varying the correction constant α in correspondence with the air outlet mode of the front-seat air conditioner unit 1 will now be described.

When the front-seat air conditioner unit 1 is in the foot mode, since the air blown out from the front-seat air conditioner unit 1 flows through the floor side where there exists obstacles such as the front-seats, the air is unlikely to flow into the rear-seat side. When the front-seat air conditioner unit 1 is in the face mode, since the air blown out from the front-seat air conditioner unit 1 flows through the upper side of the passenger compartment, the air is more likely to flow into the rear-seat side than in the foot mode.

Accordingly, in the face mode in which the degree of the influence on the rear-seat side is high, the correction constant a is set to be larger so as to increase the amount for cancelling the influence. On the other hand, in the foot mode in which the degree of the influence on the rear-seat side is low, the correction constant is set to be smaller so as to decrease the amount for cancelling the influence.

Figure 11:
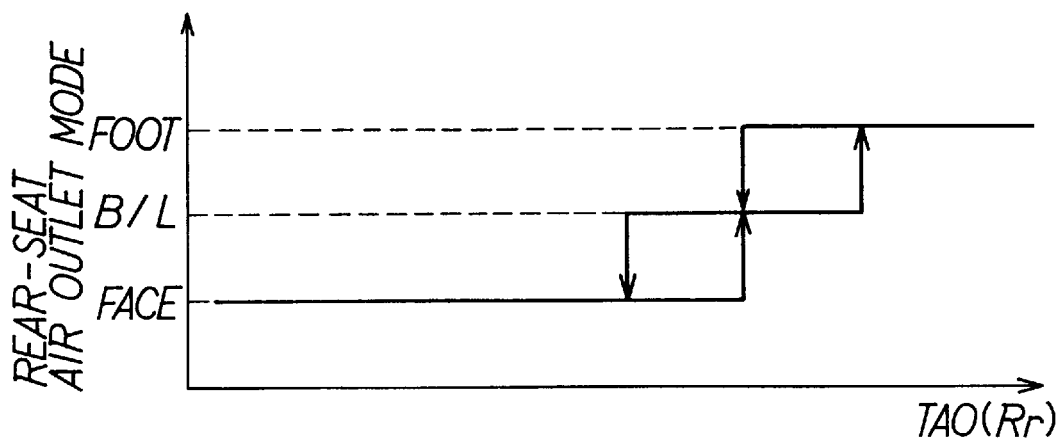
FIG. 11 is a map showing a relationship between a rear-seat air outlet mode and a target air temperature according to the first embodiment.

In step S90 of FIG. 4, the air outlet mode of the rear-seat air conditioner unit 2 is determined based on the TAO (Rr) and a map of FIG. 11, which is pre-stored in the ROM.

Figure 12:
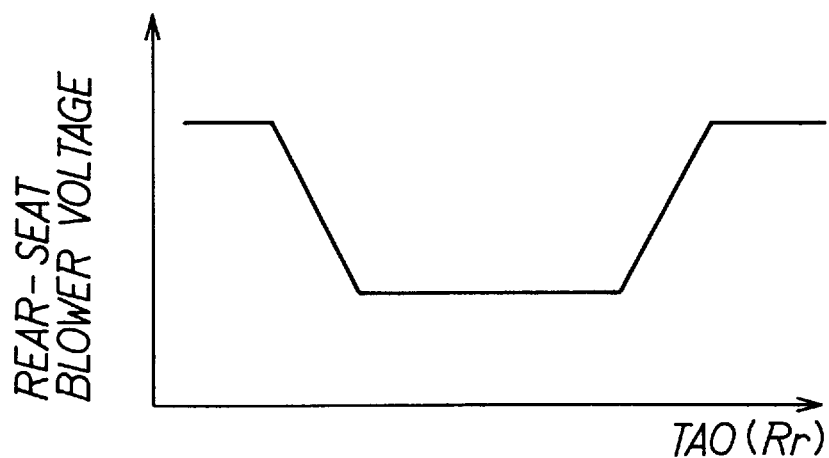
FIG. 12 is a map showing a relationship between a rear-seat blower voltage and a target air temperature according to the embodiment of the present invention.

In the next step S100, the rear-seat blower voltage applied to the blower motor 32 of the rear-seat air conditioner unit 2 is determined based on the TAO(Rr) and a map of FIG. 12, which is pre-stored in the ROM.

In the next step S110, the target opening degrees θ(Fr) and θ(Rr) (unit:%) for the air mix doors 20 and 37 are determined according to the following equations (3) and (4) which are pre-stored in the ROM.

$$\theta(Fr)=100\times(TAO(Fr)-Te(Fr))/(Tw-Te(Fr)) \quad (3)$$

$$\theta(Rr)=100\times(TAO(Rr)-Te(Rr))/(Tw-Te(Rr)) \quad (4)$$

In the next step S120, control signals are output to the respective actuators so as to obtain the respective modes that have been determined in the steps S50 to S70 and steps S90 to S110.

In the next step 130, it is determined whether or not a predetermined control period time τ has lapsed. When the determination is YES, it turns back to step S20. When the determination is NO, the lapse of the control period time T is waited.

According to this embodiment as described above, when a difference has occurred between the set temperatures of the front-seat and rear-seat sides, as understood from the equation (2), on the side of the rear-seat air conditioner unit 2, the rear-seat side target air temperature TAO(Rr) is corrected in correspondence with the difference in set temperature, and the rear-seat side blown-out air temperature is controlled according to the corrected TAO(Rr). As a result, the rear-seat air conditioner unit 2 controls the air temperature so as to cancel the thermal interference from the front-seat side, and the rear-seat side temperature is controlled to be the set temperature of Tset(Rr).

Here, when the difference in set temperature becomes too large, the temperature adjusting capacity of the rear-seat air conditioner unit becomes the maximum limit. That is, the rear-seat air mix door 37 becomes in the maximum cooling state where the bypass passage is fully opened and the rear-seat heater core is fully closed or in the maximum heating state where the bypass passage is fully closed and the rear-seat heater core is fully opened.

However, in this embodiment, when the difference in set temperature is not smaller than ±3 (°C.), i.e., there is a high possibility that the rear-seat air mix door 37 may becomes in the maximum cooling or heating state, according to the increase in the difference in set temperature, the percentage in which the inside air is sucked on the side of the front-seat air conditioner unit 1 becomes higher than the percentage determined by the second temporary target opening degree SWIB.

Accordingly, the amount of the air, which is blown out from the front-seat air conditioner unit 1 and flows into the rear-seat side, becomes small, with the result that the degree of the thermal interference with the rear-seat side space from the front-seat side becomes low. As a result, the thermal interference of the front-seat side with the rear-seat side can be canceled by the conditioned air from the front-seat air conditioner unit 1, and the rear-seat side temperature can be maintained at the Tset (Rr).

In order to confirm the comparison between the influence of this embodiment and the influence of the conventional method, the inventors actually have experimented by widely varying the front-seat side set temperature Tset(Fr) while the rear-seat side set temperature Tset(Rr) is set to 25 (°C.) according to the conventional method where the target opening degree SWI for the inside/outside air switching door 12 is determined, i.e., the first temporary target opening degree SWIA in step S52 of FIG. 5 is set to the target opening degree SWI.

Figure 13:
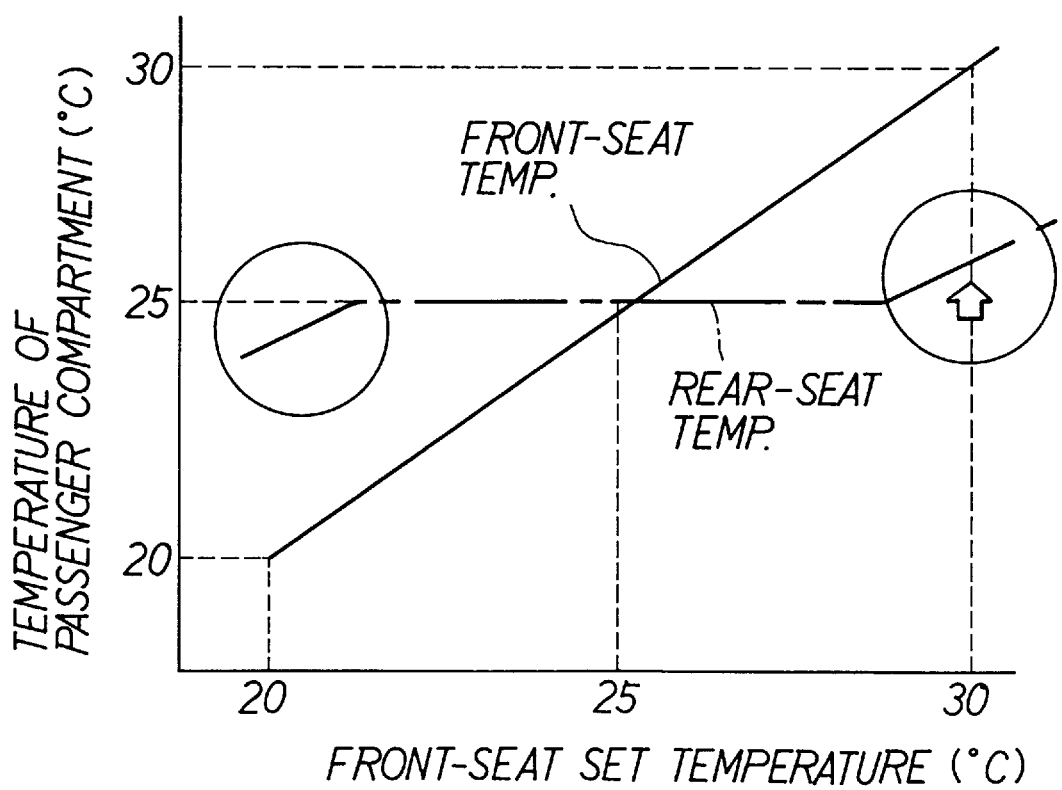
FIG. 13 is a graph of experimental results on the transition of the rear-seat side temperature.

As a result, it has been proved that, as indicated by the portions that are each marked "○" of FIG. 13, when the front-seat side set temperature Tset(Fr) is set to around 20 (°C.) or 30 (°C.), the thermal interference of the front-seat side with the rear-seat side cannot be completely cancelled by means of only the air blown out from the rear-seat air conditioner unit 2, with the result that the rear-seat side temperature may be affected by the front-seat side temperature. This experiment was performed when the outside air temperature is 10 (°C.).

In contrast to this, in this embodiment, although not illustrated, the rear-seat side temperature can be always maintained at the rear-seat side set temperature Tset(Rr) irrespective of the front-seat side set temperature Tset(Fr).

Also, in the conventional method, when the difference in set temperature becomes too large, the temperature of the air blown out from the rear-seat air conditioner unit 2 becomes excessively high or excessively low in order to cancel the thermal interference of the front-seat side with the rear-seat side due to this difference in set temperature, with the result that it may inconveniently give an uncomfortable feeling to the rear-seat passenger.

However, in this embodiment, when the difference in set temperature is greater than ±3 (°C.), the percentage in which the inside air is sucked on the side of the front-seat air conditioner unit 1 is increased, and thereby the degree of the thermal interference with the rear-seat side from the front-seat side is decreased. Therefore, it becomes unnecessary to increase or decrease excessively the temperature of the air blown out from the rear-seat air conditioner unit 2 as in the conventional method, with the result that it is possible to soften the uncomfortable feeling given to the rear-seat passenger.

Specifically, when the difference in set temperature becomes greater than ±3 (°C.), according to the increase of the difference in set temperature, the second temporary target opening degree SWIB for the inside/outside air switching door 12 becomes lower based on the map of FIG. 7. Accordingly, the final target opening degree SWI becomes lower than at least the second temporary target opening degree SWIB.

As a result, the value of the final term of the equation (2) including the difference in set temperature (Tset(Fr)–Tset(Rr)) becomes small, and the amount of correction of the TAO(Rr) which corresponds to the difference in set temperature becomes small. It is possible to prevent the temperature of the air blown out from the rear-seat air conditioner unit 2 from becoming excessively high or low.

In this embodiment, when the difference in set temperature is smaller than ±3 (°C.), it is set such that the SWIB=100 (%). In this way, the final target opening degree SWI for the inside/outside air switching door 12 is determined from the map of FIG. 6, and it is possible to obtain the inside/outside air mode which is suitable for the air conditioning state of the front-seat side.

Further, when the amount of air blown out from the front-seat air conditioner unit 1 is large, the amount of the outside air introduced into the front-seat air conditioner unit 1 may be reduced to decrease the outside air suction ratio, or the correction amount of the target temperature for the rear-seat side space may be increased to correct the target temperature for the rear-seat greatly.

Next, a second embodiment of the present invention will be described. In this embodiment, only the portion which differs from the first embodiment will be described.

In the first embodiment, the second temporary target opening degree SWIB has been determined in correspondence with the difference in set temperature irrespective of the temperature adjusting capacity of the rear-seat air conditioner unit 2, however, in the second embodiment, the second temporary target opening degree SWIB is set to 0 (%) when the difference in set temperature is equal to a predetermined value or more and the temperature adjusting capacity of the rear-seat air mix door 37 is at the maximum limit. Otherwise, the opening degree SWIB is set to 100 (%).

Figure 14:
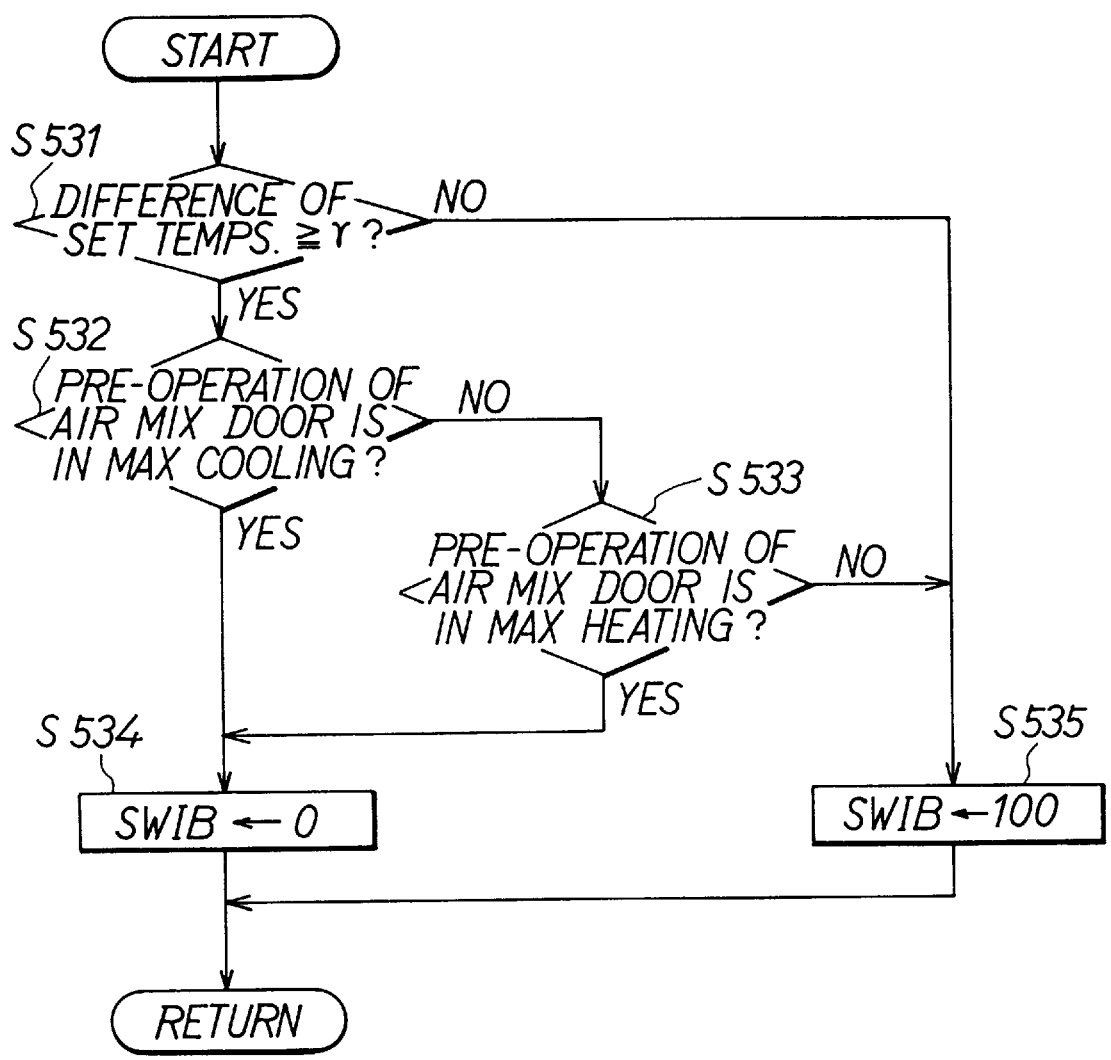
FIG. 14 is a part of a flow chart executed by the microcomputer according to a second embodiment of the present invention.

Specifically, when it proceeds to the step S53 of FIG. 5, a subroutine illustrated in FIG. 14 is called. In step S531, it is determined whether the difference in set temperature is higher than the predetermined temperature γ (±3° C. in this embodiment).

When in this step S531 a determination is NO, since the thermal interference from the front-seat side can be canceled sufficiently by the air blown out from the rear-seat air conditioner unit 2, it is set such that SWIB=100 (%).

Also, when in step S531 a determination is YES, it proceeds to steps S532 and S533, and it is determined whether or not the rear-seat air mix door 37 is in the maximum cooling state or the maximum heating state. When it has been determined that the air mix door 37 is in either the maximum cooling state or the maximum heating state, in step S534 it is set such that the SWIB=0 (%). When it has been determined that the air mix door 37 is in neither the maximum cooled state nor the maximum heated state, in step S535 it is set such that the SWIB=100 (%). Then, the process exits from this subroutine.

According to this embodiment as mentioned above, in a case where the temperature adjusting capacity of the rear-seat air mix door 37 becomes the maximum limit, when the difference in set temperature is at the predetermined temperature γ, the thermal interference from the front-seat side cannot be cancelled by the air blown out from the rear-seat air conditioner unit, however, since the inside/outside air mode of the front-seat air conditioner unit 1 is set in the complete inside air circulation mode, the thermal interference from the front-seat side can be canceled, and the rear-seat side temperature can be maintained at the set temperature Tset(Rr).

In each of the above-mentioned embodiments, the set temperatures Tset(Fr) and Tset(Rr) are employed as the target temperatures, however, the target air temperatures TAO (Fr) and TAO(Rr), or the inside air temperatures of the front and rear-seat sides may be employed as the target temperatures.

Figure 15:
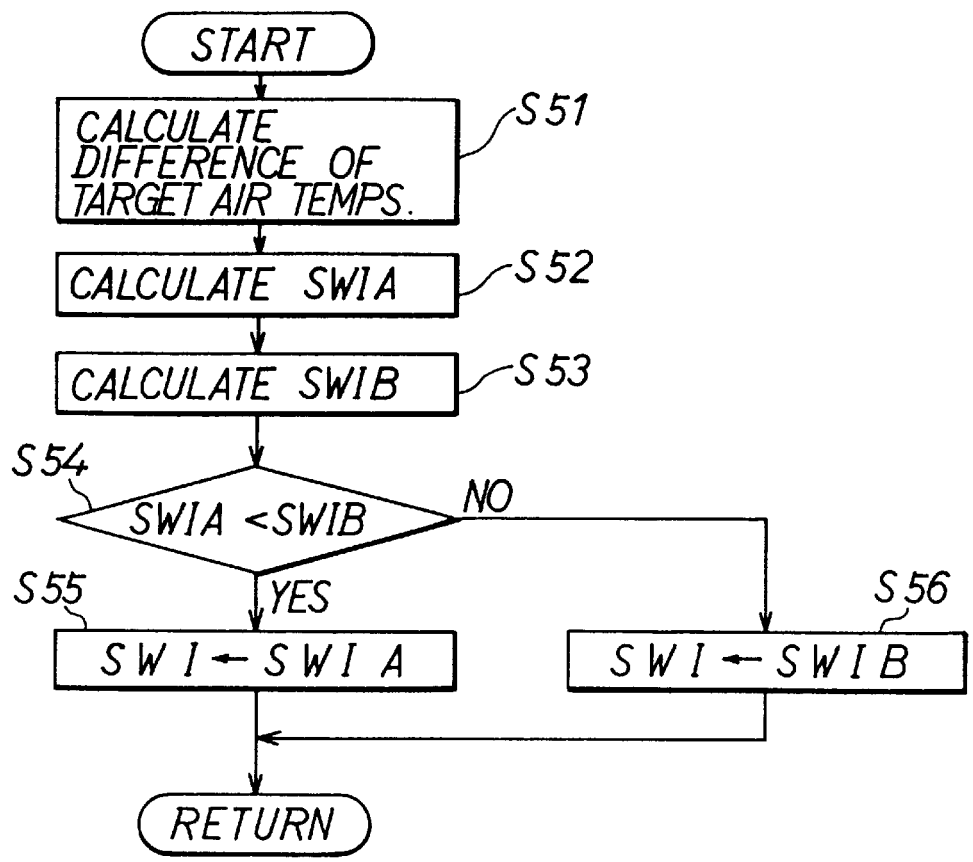
FIG. 15 is a flow chart illustrating the detail of a step S50 in FIG. 4 according to a modification.
Figure 16:
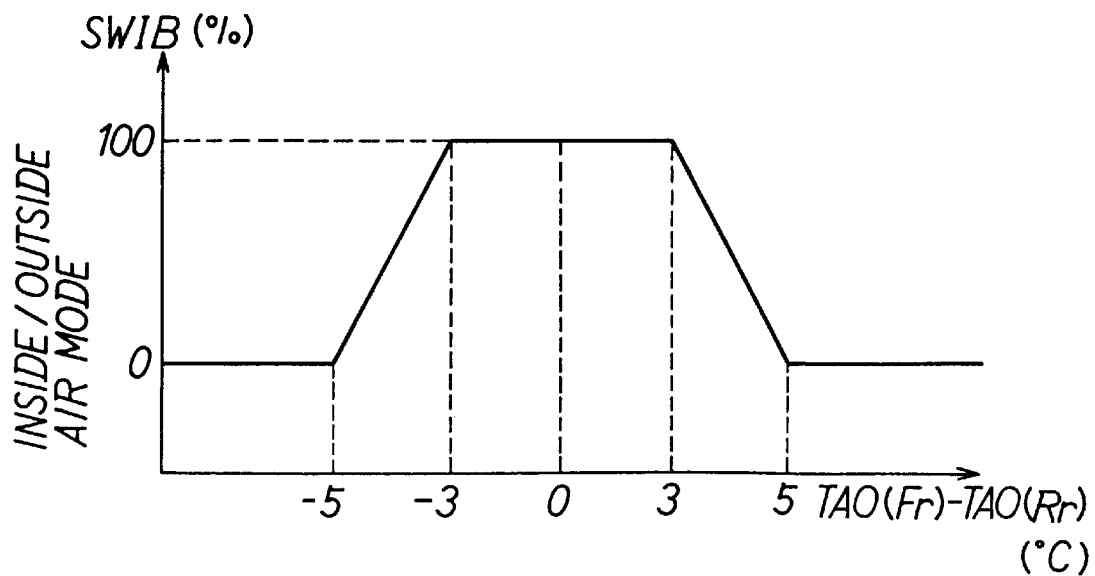
FIG. 16 is a map showing a relationship between a second temporary target opening degree SWIB for the inside/outside switching door and a difference of target temperature between a front-seat side and a second seat side according to the modification.

When the target air temperatures TAO (Fr) and TAO(Rr) of the front and rear-seat sides are employed as the target temperatures, the process are performed as illustrated in FIGS. 15 and 16, in the same manner as in FIG. 5 and 7. In this case, the first temporary target opening degree SWI for the inside/outside air switching door 12 is determined in the same manner as in the map of FIG. 6.

In each of the above-mentioned embodiments, the air conditioner unit in which the rear-seat evaporator 33, rear-seat heater core 35 and rear-seat air mix door 37 are disposed on the rear-seat side so as to perform the cooling and heating operations is employed, however, the air conditioner unit in which a cooler unit for performing only the cooling operation and a heater unit for performing only the heating operation are independently disposed on the rear-seat side may be employed.

In the second embodiment in step S534 of FIG. 14, the second temporary target opening degree SWIB for the inside/outside air switching door 12 is evenly set to 0 (%), however, the SWIB may be calculated in the step S534 from the map of FIG. 7 as in the first embodiment.

In each of the above-mentioned embodiments, the inside/outside air mode is determined linearly, however, the inside/outside air mode may be determined stepwise such as in two stages (the complete outside air introduction mode and complete inside air circulation mode) or in three stages (the complete outside air introduction mode, inside-air/outside-air mix mode and complete inside air circulation mode).

In each of the above-mentioned embodiments, the rear-seat air conditioner unit 2 is operated only in the inside air circulation mode, however, the rear-seat air conditioner unit 2 may be operated in both the inside air circulation mode and the outside air introduction mode.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined in the appended claims.

What is claimed is:

1. An air conditioner for a vehicle having a front-seat side space and a rear-seat side space in a passenger compartment, in which a discharge port for discharging air having been introduced into said passenger compartment to the outside thereof is formed in said rear-seat, side space said air conditioner comprising:
    a front-seat air conditioner unit having inside/outside air switching means and front-seat side temperature adjusting means, said inside/outside air switching means being for switching a suction ratio between an amount of an inside air sucked from said passenger compartment and an amount of an outside air sucked from the outside of said passenger compartment, and said front-seat side temperature adjusting means being for adjusting temperature of air blown out into said front-seat side space in said passenger compartment;
    a rear-seat air conditioner unit having rear-seat side temperature adjusting means for adjusting temperature of air blown out into said rear-seat side space in said passenger compartment;
    control means for controlling each of said front-side and rear-seat side temperature adjusting means so that the respective temperatures in said front-seat and rear-seat side spaces become target temperatures; and
    inside/outside air control means for controlling said inside/outside air switching means so that when a difference between said target temperature for said front-seat side space and said target temperature for said rear-seat side space is more than a predetermined value, a ratio of the outside air sucked into said front-seat air conditioner unit is set to a predetermined value or less.

2. An air conditioner as set forth in claim 1, wherein, said inside/outside air control means controls the inside/outside air switching means so that when the difference between said target temperatures is equal to said predetermined value or more, said ratio of the outside air sucked into said front-seat air conditioner unit becomes lower according to an increase in said difference between said target temperatures.

3. An air conditioner as set forth in claim 2, wherein, said inside/outside air control means includes target suction ratio calculating means for calculating a target suction ratio for the outside air so that when the difference between the target temperatures is equal to said predetermined value or more, said ratio of the outside air sucked into said front-seat air conditioner unit becomes lower according to an increase in said difference between said target temperatures, and said inside/outside air control means controls said inside/outside air switching means so that said ratio of the outside air sucked into said front-seat air conditioner unit is set to said target suction ratio or less.

4. An air conditioner as set forth in claim 1, wherein, said inside/outside air control means includes target temperature difference determining means for determining whether or not the difference between said target temperatures is equal to said prescribed value or more, and said inside/outside air control means controls said inside/outside air switching means so that, when it is determined by said between-target-temperature difference determining means that said difference is equal to said predetermined value or more, said ratio of the outside air sucked into said front-seat air conditioner unit is set to said target suction ratio or less.

5. An air conditioner as set forth in claim 4, wherein, said inside/outside air control means includes temperature adjusting capacity determining means for determining whether or not a temperature adjusting capacity of said temperature adjusting means of said rear-seat air conditioner unit is in the maximum limit, and said inside/outside air control means controls said inside/outside air switching means so that, when it is determined by said target-temperature difference determining means that said difference between said target temperatures is equal to said predetermined value or more and it is determined by said temperature adjusting capacity determining means that said temperature adjusting capacity of said temperature adjusting means is in the maximum limit, said ratio of the outside air sucked into said front-seat air conditioner unit is set to said predetermined value or less.

6. An air conditioner as set forth in claim 1, further comprising:
    front-seat side temperature setting means for setting a temperature of the front-seat side space in said passenger compartment; and
    rear-seat side temperature setting means for setting a temperature of the rear-seat side space in said passenger compartment, wherein,
    when said temperature set by said front-seat side temperature setting means is higher than that set by said rear-seat side temperature setting means, said target temperature for said rear-seat side space is lowered.

7. An air conditioner as set forth in claim 6, wherein, said target temperature for the rear-seat side space is lowered according to a decrease in said ratio of the outside air sucked into said front-seat air conditioner unit.

8. An air conditioner as set forth in claim 1, further comprising:
    front-seat side temperature setting means for setting a temperature of the front-seat side space in said passenger compartment, which is operated by a passenger; and
    rear-seat side temperature setting means for setting a temperature of the rear-seat side space in said passenger compartment, which is operated by a passenger, wherein,
    when said temperature set by said front-seat side temperature setting means is lower than that set by said rear-seat side temperature setting means, said target temperature for said rear-seat side space is increased.

9. An air conditioner as set forth in claim 8, wherein, said target temperature for the rear-seat side space is lowered according to a decrease in said ratio of the outside air sucked into said front-seat air conditioner unit.

10. An air conditioner as set forth in claim 1, further comprising:

front-seat side temperature setting means for setting a temperature of the front-seat side space in said passenger compartment, which is operated by a passenger; and rear-seat side temperature setting means for setting a temperature of the rear-seat side space in passenger compartment, which is operated by a passenger, wherein, said target temperature for the front-seat side space is a set temperature set by said front-seat side temperature setting means, and said target temperature for the rear-seat side space is a set temperature set by said rear-seat side temperature setting means.

11. An air conditioner as set forth in claim 10, further comprising:

front-seat inside air temperature detecting means for detecting a temperature of the inside air of said front-seat side space;

rear-seat inside air temperature detecting means for detecting a temperature of the inside air of said rear-seat side space;

front-seat target air temperature calculating means for calculating a front-seat target air temperature based on said temperature of the inside air detected by said front-seat inside air temperature detecting means and said set temperature set by said front-seat temperature setting means; and rear-seat target air temperature calculating means for calculating a rear-seat target air temperature based on said temperature of the inside air detected by said rear-seat inside air temperature detecting means and said set temperature set by said rear-seat temperature setting means, wherein, said target temperature for said front-seat side space is said front-seat target air temperature calculated by said front-seat target air temperature calculating means, and said target temperature for said rear-seat side space is said rear-seat target air temperature calculated by said rear-seat target air temperature calculating means.

12. An air conditioner for a vehicle having a front-seat side space and a rear-seat side space in a passenger compartment, in which a discharge port for discharging air having been introduced into said passenger compartment to the outside thereof is formed in said rear-seat side space, said air conditioner comprising:

a front-seat air conditioner unit having inside/outside air switching means and front-seat side temperature adjusting means, said inside/outside air switching means being for switching a suction ratio between an amount of an inside air sucked from said passenger compartment and an amount of an outside air sucked from the outside of said passenger compartment, and said front-seat side temperature adjusting means being for adjusting temperature of air blown out into said front-seat side space in said passenger compartment;

a rear-seat air conditioner unit having rear-seat side temperature adjusting means for adjusting temperature of air blown out into said rear-seat side space in said passenger compartment;

front-seat side target temperature determining means for determining a target temperature for said front-seat side space;

rear-seat side target temperature determining means for determining a target temperature for said rear-seat side space; and control means for controlling each of said front-side and rear-seat side temperature adjusting means so that the respective temperatures in said front-seat and rear-seat side spaces become target temperatures; wherein, said rear-seat side target temperature determining means determines said target temperature for the rear-seat side space according to a ratio of the outside air sucked into said front-seat air conditioner unit.

13. An air conditioner as set forth in claim 12, further comprising:

front-seat side temperature setting means for setting a temperature of the front-seat side space in said passenger compartment, which is operated by a passenger in said front-seat side space; and rear-seat side temperature setting means for setting a temperature of the rear-seat side space in said passenger compartment, which is operated by a passenger in said rear-seat side space; wherein, when said temperature set by the front-seat side temperature setting means is higher than that set by said rear-seat side temperature setting means, said rear-seat side target temperature determining means controls said target temperature for the rear-seat side space so that said target temperature for the rear-seat side space is lowered according to an increase in said ratio of the outside air sucked into said front-seat air conditioner unit.

14. An air conditioner as set forth in claim 12, further comprising:

front-seat side temperature setting means for setting a temperature of said front-seat side space in said passenger compartment, which is operated by a passenger in said front-seat side space; and rear-seat side temperature setting means for setting a temperature of said rear-seat side space in said passenger compartment, which is operated by a passenger in said rear-seat side space; wherein, when said temperature set by said front-seat side temperature setting means is lower than that set by said rear-seat side temperature setting means, said rear-seat side target temperature determining means controls said target temperature for the rear-seat side space so that said target temperature for the rear-seat side space is increased according to an increase in said ratio of the outside air sucked into said front-seat air conditioner unit.

15. An air conditioner as set forth in claim 13, wherein:

said front-seat air conditioner unit includes:

a face opening portion for blowing out air toward an upper half body of the passenger in said front-seat side space;

a foot opening portion for blowing out air toward feet of the passenger in said front-seat side space; and opening portion opening/closing means for opening and closing said face opening portion and said foot opening portion, wherein, said rear-seat target temperature determining means determines said target temperature for the rear-seat side space, so that said target temperature for the rear-seat side space at a time of a face mode in which said opening portion opening/closing means opens said face opening portion and closes said foot opening portion is lower than a time of a foot mode in which said opening portion opening/closing means closes said face opening portion and opens said foot opening portion.

16. An air conditioner as set forth in claim 14, wherein, said front-seat air conditioner unit includes:
   a face opening portion for blowing out air into toward an upper half body of the passenger in said front-seat side space;
   a foot opening portion for blowing out air toward feet of the passenger in said front-seat side space; and
   opening portion opening/closing means for opening and closing said face opening portion and said foot opening portion, and
   said rear-seat target temperature determining means determines said target temperature for the rear-seat side space, so that said target temperature for the rear-seat side space at a time of a face mode in which said opening portion opening/closing means opens said face opening portion and closes said foot opening portion is higher than a time of a foot mode in which said opening portion opening/closing means closes said face opening portion and opens said foot opening portion.

17. An air conditioner for a vehicle having a front-seat side space and a rear-seat side space in a passenger compartment, in which a discharge port for discharging air having been introduced into said passenger compartment to the outside thereof is formed in said rear-seat side space, said air conditioner comprising:
   a front-seat air conditioner unit having inside/outside air switching means and front-seat side temperature adjusting means, said inside/outside air switching means being for switching a suction ratio between an amount of an inside air sucked from said passenger compartment and an amount of an outside air sucked from the outside of said passenger compartment, and said front-seat side temperature adjusting means being for adjusting temperature of air blown out into said front-seat side space in said passenger compartment;
   a rear-seat air conditioner unit having rear-seat side temperature adjusting means for adjusting temperature of air blown out into said rear-seat side space in said passenger compartment;
   front-seat side target temperature determining means for determining a target temperature for said front-seat side space;
   rear-seat side target temperature determining means for determining a target temperature for said rear-seat side space;
   control means for controlling each of said front-side and rear-seat side temperature adjusting means so that the respective temperatures in said front-seat and rear-seat side spaces become target temperatures; and
   correcting means for correcting said target temperature for said rear-seat side space determined by rear-seat side target temperature determining means according to a ratio of the outside air sucked into said front-seat air conditioner unit.

18. An air conditioner as set forth in claim 17, wherein said correcting means corrects said target temperature by using a correction constant indicative of an air outlet mode of said front-seat air conditioner unit.

19. An air conditioner as set forth in claim 18, wherein, said front-seat air conditioner unit includes:
   a face opening portion for blowing out air into toward an upper half body of the passenger in said front-seat side space;
   a foot opening portion for blowing out air toward feet of the passenger in said front-seat side space; and
   opening portion opening/closing means for opening and closing said face opening portion and said foot opening portion, and
   said correction constant in a face mode in which said opening portion opening/closing means opens said face opening portion and closes said foot opening portion is larger than that in a foot mode in which said opening portion opening/closing means closes said face opening portion and opens said foot opening portion.

* * * * *